(12) United States Patent
Oh et al.

(10) Patent No.: US 7,411,716 B2
(45) Date of Patent: Aug. 12, 2008

(54) GEL POLYMER ELECTROLYTE CONTAINING IONIC LIQUID AND ELECTROCHROMIC DEVICE USING THE SAME

(75) Inventors: Jae Seung Oh, Seoul (KR); Jae Duk Park, Daejeon (KR); Byoung Bae Lee, Daejeon (KR); Won Jong Kwon, Daejeon (KR); Sang Ho Kim, Daejeon (KR); Su Jin Mun, Andong-si (KR)

(73) Assignee: LG Chem, Ltd., Seoul (KR)

( * ) Notice: Subject to any disclaimer, the term of this patent is extended or adjusted under 35 U.S.C. 154(b) by 96 days.

(21) Appl. No.: 11/108,063

(22) Filed: Apr. 18, 2005

(65) Prior Publication Data
US 2005/0231785 A1 Oct. 20, 2005

(30) Foreign Application Priority Data
Apr. 19, 2004 (KR) ............ 10-2004-0026710

(51) Int. Cl.
*G02F 1/15* (2006.01)
*G02F 1/153* (2006.01)
(52) U.S. Cl. ............... 359/265; 359/270
(58) Field of Classification Search ........ 359/265, 359/266, 267, 268, 269, 270, 271, 272, 273, 359/274, 275
See application file for complete search history.

(56) References Cited

U.S. PATENT DOCUMENTS

| | | | |
|---|---|---|---|
| 5,340,368 A * | 8/1994 | Koksbang et al. | ...... 29/623.5 |
| 5,441,827 A | 8/1995 | Gratzel et al. | |
| 5,827,602 A | 10/1998 | Koch et al. | |
| 6,384,321 B1 * | 5/2002 | Mikoshiba et al. | ...... 136/263 |
| 6,667,825 B2 | 12/2003 | Lu et al. | |
| 7,038,086 B2 * | 5/2006 | Shirota et al. | ...... 564/307 |

FOREIGN PATENT DOCUMENTS

| | | |
|---|---|---|
| EP | 0 612 826 | 10/2000 |
| KR | 1020030037100 | 5/2003 |
| WO | WO97/34186 | 9/1997 |

OTHER PUBLICATIONS

Dissanayake, M.A.K.L. et al., "A Novel Gel Polymer Electrolyte Based on Polyacrylonitrile (PAN) and Its Application in a Sonar Cell", *Materials Research Bullentin 37* (2002), pp. 868-870.

Panero, Stefania et al., "Electrochromic Windows Based on Polyaniline, Tungsten Oxide abd Gel Electrolytes", *Solar Energy Materials and Solar Cells 39* (1995), pp. 239-242.

\* cited by examiner

*Primary Examiner*—Ricky Mack
*Assistant Examiner*—Tuyen Tra
(74) *Attorney, Agent, or Firm*—McKenna Long & Aldridge LLP

(57) ABSTRACT

Disclosed is an electrochromic device comprising: (a) a first electrode; (b) a second electrode; (c) an electrochromic material; and (d) a gel polymer electrolyte containing an ionic liquid. A method for manufacturing the same is also disclosed. The electrochromic device uses a gel polymer electrolyte comprising an ionic liquid. Therefore, there is no problem related with electrolyte leakage. Additionally, it is possible to manufacture electrochromic devices by using plastic materials, because the ionic liquid gel polymer electrolyte permits structural deformation with ease. Further, because the electrochromic device uses an ionic liquid, it is possible to minimize side reactions between constitutional elements of an electrochromic device and electrolyte.

5 Claims, 2 Drawing Sheets

GEL POLYMER ELECTROLYTE CONTAINING IONIC LIQUID AND ELECTROCHROMIC DEVICE USING THE SAME

CROSS-REFERENCE TO RELATED APPLICATIONS

This application claims the benefit of Korean Patent Application No. 10-2004-0026710 filed Apr. 19, 2004 in Korea, which are hereby incorporated by reference in their entirety.

TECHNICAL FIELD

The present invention relates to an ionic liquid gel polymer electrolyte formed by polymerizing an electrolyte precursor solution comprising an ionic liquid and a monomer capable of forming a gel polymer by polymerization. The present invention also relates to an electrochromic device comprising the above ionic liquid gel polymer electrolyte and a method for manufacturing the same.

BACKGROUND ART

In general, electrochromic devices are referred to as devices that experience a change in color due to an electrochemical redox reaction caused by the application of an electric field, resulting in a change in light transmission characteristics. Typical electrochromic materials include tungsten oxides found by S. K. Deb in 1969. Thereafter, electrochromism of various organic/inorganic materials has been studied, followed by continuous development and research into the application of electrochromic devices comprising such materials in the field of smart window and display technology.

Electrochromic materials are classified into reduction-colored materials and oxidation-colored materials. Reduction-colored materials are those colored by the acquisition of electrons and typically include tungsten oxides. Meanwhile, oxidation-colored materials are those colored by the loss of electrons and typically include nickel oxides and cobalt oxides. Other electrochromic materials include inorganic metal oxides such as $Ir(OH)_x$, $MoO_3$, $V_2O_5$, $TiO_2$, etc., conductive polymers such as PEDOT (poly-3,4-ethylenedioxy thiophene), polypyrrole, polyaniline, polyazulene, polythiophene, polypyridine, polyindole, polycarbazole, polyazine, polyquinone, etc., and organic electrochromic materials such as viologen, anthraquinone, phenocyazine, etc.

The above inorganic metal oxides generate a change in color when lithium ions or hydrogen ions present in an electrolyte are doped into the inorganic metal oxides. On the contrary, as depicted in the following formula 1, conductive polymers, for example, polyaniline shows a light yellow color when it is present in a completely reduced state, while showing a blue color when it is present in a state doped with anions by oxidation. Various colors can be realized depending on the kinds of such conductive polymer. [Formula 1]

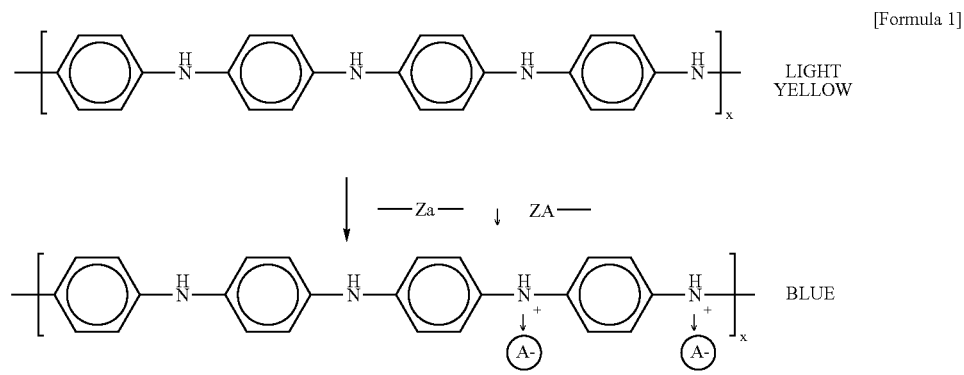

In addition to the above-mentioned inorganic metal oxides and conductive polymers, organic electrochromic materials include viologen compounds such as 4,4'-dipyridinium salt represented by the following formula 2. A viologen compound has three types of oxidation states, i.e., $v^{2+}$ (colorless), $V^+$ (blue) and $V^0$ (light yellow), each oxidation state showing a different color: [Formula 2]

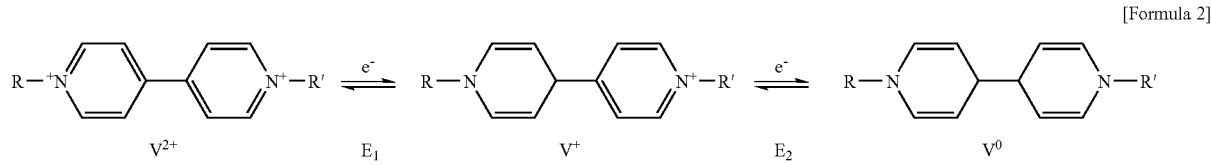

Meanwhile, U.S. Pat. No. 5,441,827 (Graetzel et al.) discloses a device having high efficiency and high response rate, the device being manufactured by coating an electrochemically active organic viologen compound, as a single layer, onto the surface of a nanoporous thin film electrode obtained by sintering metal oxide nanoparticles. Additionally, the device uses a mixture of a lithium salt with an organic solvent such as γ-butyrolactone and propylene carbonate, as liquid electrolyte. However, the device using an organic solvent-containing liquid electrolyte has disadvantages in that quenching rate is low, residual images are present after quenching and that the organic materials may be decomposed easily during repeated developing/quenching cycles. Moreover, because the device uses an organic solvent-containing liquid electrolyte, it has additional disadvantages in that evaporation and exhaustion of the electrolyte may occur, the electrolyte may leak out from the device to cause an environmentally unfavorable problem, and that formation into thin films and film-shaped products is not allowed.

U.S. Pat. No. 5,827,602 (V. R. Koch et al.) discloses an ionic liquid electrolyte based on $AlCl_3$-EMICl (aluminum chloride-1-ethyl-3-methylimidazolium chloride) including a strong Lewis acid. The ionic liquid such as $AlCl_3$-EMICl has no vapor pressure, and thus can solve the problem of exhaustion and decomposition of electrolyte. However, it may emit toxic gases when exposed to a small amount of moisture and oxygen. Moreover, the ionic liquid is problematic in that it has high reactivity with organic/inorganic compounds added to the electrolyte in a small amount and that it is easily decomposed at a temperature of 150° C. or higher.

U.S. Pat. No. 6,667,825 (Wen Lu et al.) discloses an electrochromic device that uses a conductive polymer and an ionic liquid such as [BMIM][$BF_4$] containing no Lewis acid, as electrode and electrolyte, respectively. Use of the ionic liquid containing no Lewis acid results in improvement of stability and lifespan of electrochromic devices. Additionally, it is possible to solve, at least in part, the problems with which organic solvent-based liquid electrolytes and ionic liquid electrolytes containing a Lewis acid are faced, i.e., the problems of residual images after quenching, decomposition of electrolytes or the like. However, because the electrochromic device according to U.S. Pat. No. 6,667,825 uses an ionic liquid as liquid electrolyte, it still has problems in that leakage of electrolyte may occur and that formation into thin films and film-shaped products is not allowed.

In order to complement such disadvantages of liquid electrolytes, polymer electrolytes have appeared recently. For example, Maroco-A.De Paoli discloses a polymer electrolyte formed by mixing an organic liquid compound with poly(epichlorohydrin-co-ethylene oxide) (see, Electrochimica Acta 46, 2001, 4243-4249). However, the above polymer electrolyte shows a significantly low conductivity of about $10^{-5}$ S/cm. Additionally, S. A. Agnihotry discloses a polymer electrolyte having a high ion conductivity of $10^{-3}$ S/cm at room temperature, the polymer electrolyte being formed by adding a small amount of PMMA (polymethyl methacrylate) polymer and fumed silica to an electrolyte formed of propylene carbonate containing 1M $LiClO_4$ added thereto (see, Electrochimica Acta. 2004). However, because the above polymer electrolyte still uses an organic solvent as electrolyte, it is not possible to solve the problems of low quenching rate, residual images after quenching, decomposition and exhaustion of organic solvent-based electrolytes, or the like.

BRIEF DESCRIPTION OF THE DRAWINGS

The foregoing and other objects, features and advantages of the present invention will become more apparent from the following detailed description when taken in conjunction with the accompanying drawings in which.

DISCLOSURE OF THE INVENTION

Figure 1:
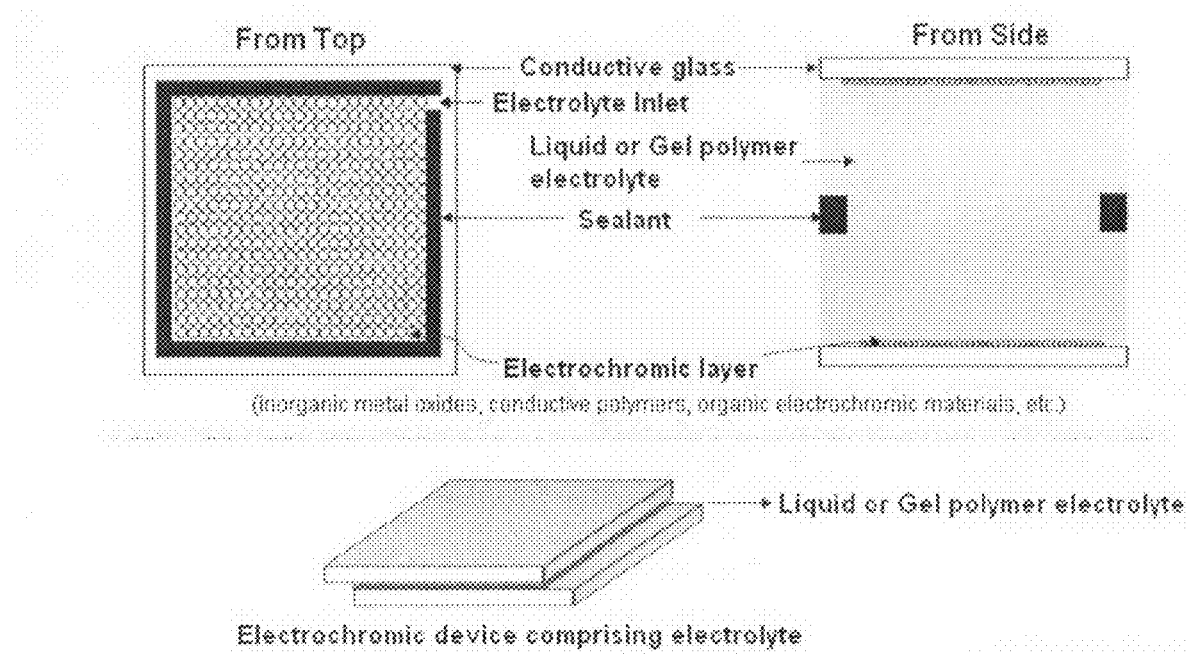
FIG. 1 is a sectional view showing a conventional electrochromic device.

Therefore, the present invention has been made in view of the above-mentioned problems. It is an object of the present invention to provide an electrochromic device using a gel polymer electrolyte impregnated with an ionic liquid, with no use of organic solvent. According to the electrochromic device of the present invention, it is possible to solve the problems with which conventional electrochromic devices using an ionic liquid present in a liquid state as electrolyte are faced, such problems being that leakage of electrolyte may occur and that formation into thin films and film-shaped products is not allowed. Additionally, it is possible to solve the problems of significantly low conductivity of polymer electrolytes according to the prior art. Further, it is possible to solve the problems caused by organic solvents used in polymer electrolytes having high ion conductivity according to the prior art.

According to an aspect of the present invention, there is provided an electrochromic device, which includes: (a) a first electrode; (b) a second electrode; (c) an electrochromic material; and (d) a gel polymer electrolyte containing an ionic liquid. A method for manufacturing the same device is also provided.

According to another aspect of the present invention, there is provided an electrolyte useful for the above electrochromic device.

Hereinafter, the present invention will be explained in more detail.

The present invention is characterized in that the gel polymer electrolyte is formed by using an ionic liquid combined with a monomer capable of forming a gel polymer by polymerization, wherein the ionic liquid substitutes for an organic solvent used as a constitutional element of liquid electrolyte or gel polymer electrolytes in conventional electrochromic devices.

The ionic liquid gel polymer electrolyte does not use organic solvents that cause leakage of electrolyte, side reactions with other constituents and inapplicability to thin film formation and to processing into film-shaped products. Therefore, the ionic liquid gel polymer electrolyte can improve the safety of an electrochromic device as well as contribute to facilitate processing and handling during the manufacturing process of an electrochromic device.

Additionally, because the ionic liquid has high ionic concentration, it can provide performances comparable to those of liquid electrolytes, even if it takes the form of a gel polymer.

Further, the gel polymer is formed by injecting an electrolyte precursor solution including an ionic liquid and a monomer capable of forming a gel polymer by polymerization between both electrodes of an electrochromic device and then carrying out in-situ polymerization inside of the electrodes. Accordingly, it is not necessary to perform an additional post-treatment step (for example, a step of removing solvent) so that the manufacturing process of an electrochromic device can be facilitated and simplified, and thus can be cost-efficient.

1. Ionic Liquid Gel Polymer Electrolyte

One constitutional element forming the gel polymer electrolyte according to the present invention is an ionic liquid.

Generally, an ionic salt compound consisting of a metal cation and non-metal anion, such as salt (NaCl), melts at a high temperature of 800° C. or higher. On the contrary, an ionic liquid is an ionic salt present in a liquid state at a temperature of 100° C. or less. Particularly, an ionic liquid present in a liquid state at room temperature is referred to as an RTIL (room temperature ionic liquid).

Because an ionic liquid is non-volatile, it has no vapor pressure and shows high ion conductivity. Particularly, because an ionic liquid has strong polarity to dissolve inorganic and organic compounds well and is characteristically present in a liquid state at a broad range of temperatures, it can be applied to various fields of chemistry including catalysts, separation technology and electrochemistry. Additionally, an ionic liquid has a decreased melting temperature due to its low symmetricity, weak intermolecular attraction force and charge distribution in cations. Further, an ionic liquid has non-toxicity, inflammability and excellent thermal stability as well as shows physicochemical characteristics as environmental-friendly advanced solvent capable of substituting for conventional toxic organic solvents. Such physicochemical characteristics include a broad range of temperatures where it can be present as liquid, high salvation capability and non-coordination bond forming capability.

Physical and chemical properties of an ionic liquid are significantly affected by the structure of the cation and anion in the ionic liquid and may be optimized depending on user's demands. For example, properties of 1-alkyl-3-methyl imidazolium derivatives as ionic liquid can be controlled by simply varying the length of alkyl group, even though they have the same anion.

The ionic liquid used in the present invention may be formed of an organic cation and inorganic anion. Compatibility of an ionic liquid with a vinyl monomer varies depending on the kind of anion. Such compatibility critically affects the transparency of a gel polymer electrolyte using the ionic liquid and vinyl monomer. The kind of anion in an ionic liquid determines whether the ionic liquid is hydrophilic or hydrophobic. Particularly, in the case of a hydrophobic ionic liquid, a vinyl monomer such as HEMA (2-hydroxyethyl methacrylate) has poor compatibility with a vinyl monomer, resulting in formation of an opaque gel polymer electrolyte.

Non-limiting examples of the cation of the ionic liquid that may be used according to the present invention include the following cations, wherein each of $R_1$-$R_6$ represents a C1-C9 alkyl group or phenyl group:

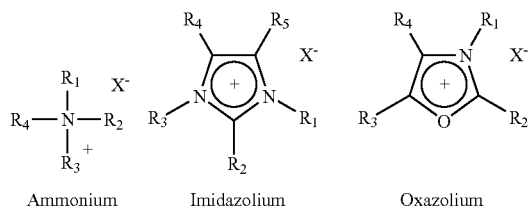

Ammonium   Imidazolium   Oxazolium

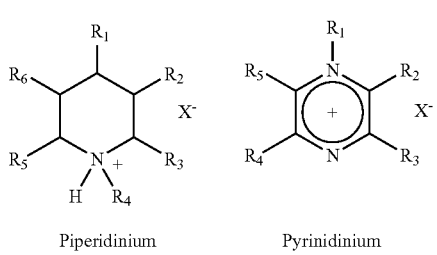

Piperidinium   Pyrinidinium

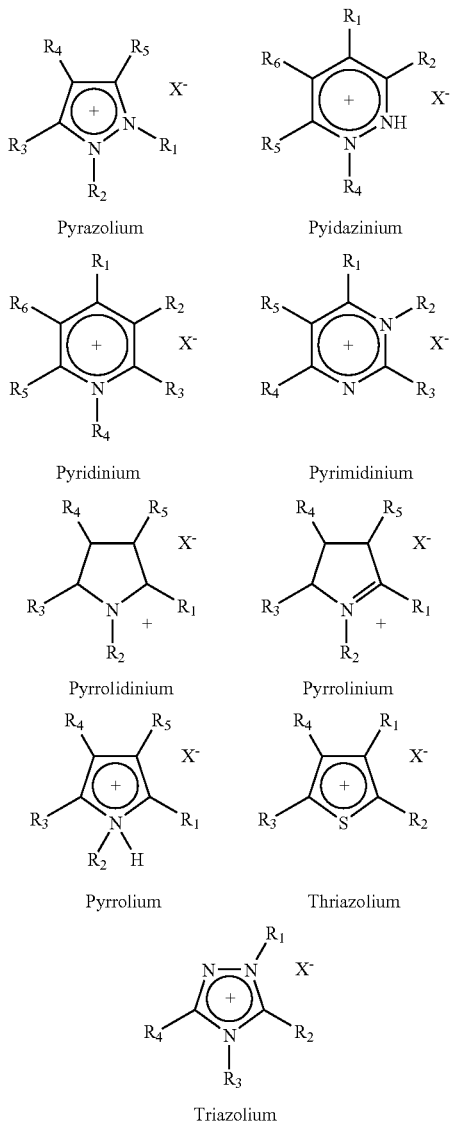

Pyrazolium   Pyidazinium

Pyridinium   Pyrimidinium

Pyrrolidinium   Pyrrolinium

Pyrrolium   Thriazolium

Triazolium

Additionally, non-limiting examples of the anion ($X^-$) that may be used according to the present invention include $F^-$, $Cl^-$, $Br^-$, $I^-$, $NO_3^-$, $N(CN)_2^-$, $BF_4^-$, $ClO_4^-$, $RSO_3^-$, $RCOO^-$ (wherein R is a C1~C9 alkyl group or phenyl group); $PF_6^-$, $(CF_3)_2PF_4^-$, $(CF_3)_3PF_3^-$, $(CF_3)_4PF_2^-$, $(CF_3)_5PF^-$, $(CF_3)_6P^-$, $(CF_3SO_3^-)_2$, $(CF_2CF_2SO_3^-)_2$, $(CF_3SO_3)_2N^-$, $CF_3CF_2(CF_3)_2CO^-$, $(CF_3SO_2)_2CH^-$, $(SF_5)_3C^-$, $(CF_3SO_2)_3C^-$, $CF_3(CF_2)_7SO_3^-$, $CF_3CO_2^-$, $CH_3CO_2^-$, etc.

The other constitutional element forming the gel polymer electrolyte according to the present invention is a conventional monomer known to one skilled in the art. There is no limitation in the kind of monomer as long as it is capable of forming a gel polymer by polymerization.

The monomer capable of forming a gel polymer by polymerization includes vinyl monomers, etc. Vinyl monomers have advantages in that they can provide transparent polymerization products when mixed with an ionic liquid and that they are amenable to simple polymerization conditions.

Non-limiting examples of the vinyl monomer that may be used according to the present invention include acrylonitrile, methyl methacrylate, methyl acrylate, methacrylonitrile, methyl styrene, vinyl esters, vinyl chloride, vinylidene chloride, acrylamide, tetrafluoroethylene, vinyl acetate, methyl vinyl ketone, ethylene, styrene, para-methoxystyrene, para-cyanostyrene, polyethylene glycols (PEG), etc. Any polymerizable monomers other than the above vinyl monomers may be used.

Preferably, the monomer capable of forming a gel polymer with an ionic liquid through polymerization provides low volumetric shrinkage upon polymerization and permits in-situ polymerization inside of an electrochromic device.

The gel polymer electrolyte according to the present invention is formed by polymerizing the electrolyte precursor solution comprising the ionic liquid and the monomer capable of forming a gel polymer by polymerization. The electrolyte precursor solution may further comprise a lithium salt or acid.

Generally, electrochromic devices based on electron movement (for example, electrochromic devices using conductive polymers, organic compounds such as viologen derivatives, etc.) have no need of a lithium salt, because they are formed of a great number of ions. However, in the case of an electrochromic device using an electrode formed of inorganic metal oxides such as $WO_3$, $NiO$, etc., there is a need of a lithium salt because the electrochromic device allows a change in color when a lithium ion is inserted into the electrode. Additionally, an electrochromic device using inorganic metal oxides has a need of acid, because the electrochromism based on the inorganic metal oxides can also be realized when protons ($H^+$) present in the electrolyte are doped into the inorganic metal oxides.

Any lithium salts or acids known to one skilled in the art may be used. Preferred and particular examples of the lithium salt include lithium salts consisting of a lithium cation ($Li^+$) and the anion contained in the ionic liquid, for example, $F^-$, $Cl^-$, $Br^-$, $I^-$, $NO_3^-$, $N(CN)_2^-$, $BF_4^-$, $ClO_4^-$, $RSO_3^-$, $RCOO^-$ (wherein R is a C1~C9 alkyl group or phenyl group); $PF_6^-$, $(CF_3)_2PF_4^-$, $(CF_3)_3PF_3^-$, $(CF_3)_4PF_2^-$, $(CF_3)_5PF^-$, $(CF_3)_6P^-$, $(CF_3SO_3^-)_2$, $(CF_2CF_2SO_3^-)_2$, $(CF_3SO_3)_2N^-$, $CF_3CF_2(CF_3)_2CO^-$, $(CF_3SO_2)_2CH^-$, $(SF_5)_3C^-$, $(CF_3SO_2)_3C^-$, $CF_3(CF_2)_7SO_3^-$, $CF_3CO_2^-$, $CH_3CO_2^-$, etc. Preferred examples of the acid include acids consisting of a proton ($H^+$) and the anion contained in the ionic liquid as described above. When the anion contained in the lithium salt or acid differs from the anion forming the ionic liquid, the lithium salt or acid may have low solubility in the ionic liquid electrolyte.

Meanwhile, the electrolyte precursor solution may further comprise a conventional polymerization initiator known to one skilled in the art.

Thermal initiators that may be used in the polymerization (for example, radical polymerization initiators) include organic peroxides or hydroperoxides such as benzoyl peroxide, acetyl peroxide, dilauryl peroxide, di-tert-butyl peroxide, cumyl hydroperoxide, hydrogen peroxide, etc., and azo compounds such as 2,2-azobis(2-cyanobutane), 2,2-azobis(methylbutyronitrile), AIBN(azobis(iso-butyronitrile), AMVN (azobisdimethyl-valeronitrilie), etc.

The above-mentioned initiators are decomposed at a suitable temperature ranging from 40° C. to 80° C. to form radicals, and then react with a monomer through free radical polymerization to form a gel polymer electrolyte. It is also possible to carry out polymerization of monomers without using any initiator. Generally, free radical polymerization includes an initiation step in which transient molecules or active points having strong reactivity are formed; a propagation step in which a monomer is added to the end of an active chain to form another active point at the end of the chain; a chain transfer step in which active points are transferred to other molecules; and a termination step in which the center of an active chain is broken.

Additionally, UV polymerization initiators such as Irgacure-184, Darocure, etc., may be used to form a gel polymer electrolyte through UV polymerization.

In addition to the above-described materials, the ionic liquid gel polymer electrolyte according to the present invention optionally further comprises other additives known to one skilled in the art.

In order to form the ionic liquid gel polymer electrolyte by using the above-described electrolyte precursor solution according to a conventional method, three types of methods described hereinafter may be used.

The first method comprises forming the gel polymer electrolyte by in-situ polymerization inside of an electrode. In-situ polymerization that may be used in the present invention may be performed by heating or UV irradiation. Additionally, formation of the gel polymer electrolyte depends on polymerization time and polymerization temperature in the case of thermal polymerization, or on irradiation dose in the case of UV polymerization. Typically, polymerization time ranges from about 20 to 60 minutes and thermal polymerization temperature ranges from 40 to 80° C.

Additionally, the mixing ratio in the electrolyte precursor solution according to the present invention on the weight basis, i.e., the weight ratio of (ionic liquid) x:(monomer capable of forming a gel polymer by polymerization) y:(polymerization initiator) z, is 0.5-0.95:0.05-0.5:0.00-0.05, with the proviso that x+y+z=1. More preferably, x is 0.7-0.95, y is 0.05-0.3 and z is 0.00-0.01.

The second method that may be used in forming the gel polymer electrolyte comprises injecting the ionic liquid so that a polymer or gel polymer can be impregnated with the ionic liquid. Non-limiting examples of the polymer that may be used include PMMA, PVdF, PVC, PEO, PHEMA, etc. In this case, it is possible to simplify processing steps compared to the above in-situ polymerization method.

The third method comprises dissolving the ionic liquid and a polymer in a solvent and removing the solvent to form a gel polymer electrolyte. In this method, the ionic liquid is contained in the matrix formed of the polymer as described above.

Although there is no particular limitation in selecting the solvent, non-limiting examples of the solvent include toluene, acetone, acetonitrile, THF, etc. Additionally, there is no particular limitation in the method for removing the solvent and any conventional heating methods may be used. However, the third method has a disadvantage in that there is a need of a post-treatment step for removing a solvent in order to form the gel polymer electrolyte.

According to the present invention, it is important that the gel polymer electrolyte should be free from leakage and should not cause volumetric shrinking due to over-polymerization of electrolyte. The gel polymer electrolyte prepared according to the present invention has an ion conductivity of between $10^{-3}$ and $10^{-6}$ S/cm. Generally, the higher the ion concentration of electrolyte, the better the performance of an electrochromic device.

2. Electrochromic Device Using Ionic Liquid Gel Polymer Electrolyte

The electrochromic device according to the present invention includes a first electrode and a second electrode, disposed on a transparent or translucent substrate, and the electrolyte as disclosed herein, wherein the first electrode, the second electrode, the electrolyte, or combinations thereof include an electrochromic material.

Non-limiting examples of the electrochromic material that may be used in the present invention include inorganic metal oxides such as $WO_3$, $Ir(OH)_x$, $MoO_3$, $V_2O_5$, $TiO_2$, NiO, etc.; conductive polymers such as polypyrrole, polyaniline, polyazulene, polypyridine, polyindole, polycarbazole, polyazine, polythiophene, etc.; and organic electrochromic materials such as viologen, anthraquinone, phenocyazine, etc.

The electrochromic device may be manufactured according to a conventional method known to one skilled in the art. In one embodiment, the method includes the steps of: (a) providing a first electrode and a second electrode; (b) injecting an electrolyte precursor solution into the gap between the first electrode and the second electrode through an inlet and sealing the inlet, wherein the electrolyte precursor solution comprises (i) an ionic liquid, (ii) a monomer capable of forming a gel polymer by polymerization, and (iii) a polymerization initiator; and (c) polymerizing the electrolyte precursor solution to form an ionic liquid gel polymer electrolyte.

It is preferable that the electrolyte precursor solution comprising the ionic liquid and the monomer is injected into the gap between both electrodes and then in-situ polymerization is performed inside of the electrodes to form the ionic liquid gel polymer electrolyte. This results from the following reasons. It is easier to inject the electrolyte into the gap between the electrodes compared to injection or lamination of the gel polymer electrolyte impregnated with the ionic liquid into the gap between the electrodes. Additionally, it is possible to obtain more improved wetting and contacting capability between the ionic liquid gel polymer electrolyte and the electrodes.

Particularly, a conventional method for manufacturing an electrochromic device includes the steps of: dissolving a polymer (for example, PMMA, PVdF, PVC, PEO, PHEMA, etc.) in an organic solvent (for example, toluene, acetone, acetonitrile, THF, etc.); mixing the resultant solution with an organic liquid electrolyte; and removing the organic solvent. Thus, the method includes complicated processing steps. However, according to the present invention, the method for manufacturing an electrochromic device comprises simplified processing steps, because it includes a step of mixing an ionic liquid with a monomer at a predetermined ratio and a step of carrying out in-situ polymerization at an adequate temperature to form the gel polymer electrolyte.

Practically, the electrochromic device using the electrolyte comprising the gel polymer impregnated with the ionic liquid according to the present invention provides several advantages as follows.

1) The gel polymer serves to retain the ionic liquid, and thus solves the problem of electrolyte leakage and allows thin-film formation and processing into film-shaped products.

2) The developing/quenching rate of the electrochromic device is high, because the ionic liquid gel polymer electrolyte has higher ion concentration compared to conventional organic solvent-based electrolytes.

3) The response rate of the electrochromic device is comparable to that of an electrochromic device using a liquid electrolyte, because the ionic liquid has a high ion conductivity of $10^{-3}$ to $10^{-6}$ S/cm. Additionally, the electrochromic device according to the present invention provides more improved memory effect (see, Examples)

4) The ionic liquid has a broad electrochemical window, and thus shows a lower possibility for decomposition of electrolyte compared to organic solvent-based electrolytes.

5) It is possible to decrease side reactions in the electrochromic device, because the device uses a very stable ionic liquid.

6) There is no need of an organic solvent to form a gel polymer electrolyte due to excellent fluidity and compatibility of the ionic liquid.

7) The ionic gel polymer electrolyte has no vapor pressure, and thus is free from the problem related with evaporation and exhaustion of electrolyte.

More particularly, because electrochemical reactions result from the movement of electrons or ions, response rate of an electrochromic device depends on current strength, ion concentration and ion moving rate.

Electrochromic devices that experience a change in color by electric charges (for example, electrochromic devices using organic compounds such as viologen or conductive polymers as electrode materials) provide more improved effects in terms of response rate, electrolyte stability and residual images after quenching, when using an electrolyte comprising an ionic liquid compared to a liquid electrolyte in which a lithium salt is dissolved. This results from the reason related with the concentration of ions dissolved in the electrolyte. Particularly, a liquid electrolyte comprising a lithium salt shows a salt concentration of 0.1M-1M. However, an ionic liquid shows a higher concentration of about 5M (apparent density: 1.2 g/ml, molecular weight: 250 g/mol).

Additionally, performances of electrochromic devices that experience color developing/quenching due to lithium or hydrogen (for example, electrochromic devices using inorganic metal oxides such as $WO_3$, NiO, $Ir(OH)_x$, $MoO_3$, $V_2O_5$, $TiO_2$, etc.) are affected by ion conductivity as well as ion concentration in the electrolyte. In general, ion conductivity is measured by the movement of ions moving in the electrolyte solution. In this regard, viscosity of the solution and ion concentration in the solution affect the ion conductivity. When the viscosity of the solution decreases, ions can move more freely and thus ion conductivity increases. When the concentration of ions in the solution increases, the amount of ions increases and thus ion conductivity also increases. Conventional liquid electrolytes have low viscosity and thus show an ion conductivity of $10^{-2}$ to $10^{-4}$ S/cm, while the gel polymer electrolyte impregnated with the ionic liquid according to the present invention shows an ion conductivity of $10^{-3}$ to $10^{-6}$ S/cm.

BEST MODE FOR CARRYING OUT THE INVENTION

Reference will now be made in detail to the preferred embodiments of the present invention. It is to be understood that the following examples are illustrative only and the present invention is not limited thereto.

EXAMPLES 1-7

Example 1

Manufacture of Electrochromic Device 1-1. Manufacture of Electrochromic Device Free from Electrolyte A working electrode was manufactured by forming a thin film of $WO_3$ on ITO glass (Samsung Corning Co.) as a transparent electrode through a sputtering process to a thickness of 150 nm. A counter electrode provided with a thin film of NiO having a thickness of 150 nm was also manufactured in the same manner as described above. The working electrode and the counter electrode were sealed together along their edges except a portion by using a sealant containing a glass ball spacer, as shown in FIG. 1, to provide an electrochromic device free from electrolyte.

1-2. Manufacture of Electrochromic Device Comprising Ionic Liquid Gel Polymer as Electrolyte Prepared was an electrolyte containing 1M $LiClO_4$ as a lithium salt and further including a mixture formed of [EMIM][$BF_4$] as ionic liquid (wherein EMIM represents ethyl methyl imidazolium), HEMA (2-hydroxyethyl methacrylate) as vinyl monomer and AMVN (azo-bis-dimethylvaleronitrile) as thermal initiator in the weight ratio of 8:2:0.01. The electrolyte was injected into the electrochromic device having inorganic metal oxide, $WO_3$/NiO, electrodes obtained as described in Example 1-1. Next, the inlet for injecting the electrolyte was sealed by using a UV sealant and then polymerization was carried out at an adequate temperature of 55° C. for 1 hour to form a gel polymer electrolyte.

The ion conductivity of the resultant gel polymer electrolyte was about $10^{-3}$ S/cm at room temperature. A slightly opaque gel polymer was formed by the thermal polymerization. The electrochromic device using the opaque gel polymer electrolyte developed a blue color and showed a transmission of 29%. Upon quenching, the electrochromic device was slightly opaque and showed a transmission of 55%.

Additionally, because the electrochromic device used the above gel polymer electrolyte, it did not cause any performance problems resulting from electrolyte leakage and evaporation, and provided excellent memory effect over 72 hours or more.

Example 2

Example 1 was repeated to provide an electrochromic device comprising an ionic liquid gel polymer electrolyte, except that [BMIM] TFSI] (wherein BMIM represents butylmethyl imidazolium and TFSI represents bis(trifluoromethanesulfonyl)imide) was used as ionic liquid instead of [EMIM] $BF_4$]. Similarly to Example 1, a slightly opaque gel polymer was formed by the polymerization. The ion conductivity of the resultant gel polymer electrolyte was about $0.5~3\times10^{-3}$ S/cm.

The finished electrochromic device developed a dark blue color and showed a transmission of 29%. Upon quenching, the electrochromic device was transparent and showed a transmission of 57%. As mentioned in Example 1, the electrochromic device provided excellent memory effect over 72 hours or more.

Example 3

Example 1 was repeated to provide an electrochromic device comprising an ionic liquid gel polymer electrolyte, except that [BMIM] Triflate] was used as ionic liquid instead of [EMIM] $BF_4$]

Contrary to Example 1 and Example 2 using [EMIM] $BF_4$] and [BMIM] TFSI as ionic liquid, respectively, a very transparent gel polymer was formed. The ion conductivity of the resultant gel polymer electrolyte was about $0.5~3\times10^{-3}$ S/cm.

The finished electrochromic device developed a dark blue color and showed a transmission of 31%. Upon quenching, the electrochromic device was transparent and showed a transmission of 78%. As mentioned in Example 1, the electrochromic device provided excellent memory effect over 72 hours or more.

Example 4

Example 1 was repeated to provide an electrochromic device comprising an ionic liquid gel polymer electrolyte, except that MMA (methyl methacrylate) was used as vinyl monomer instead of HEMA.

Similarly to Example 1 using HEMA as vinyl monomer, a slightly opaque gel polymer electrolyte was formed by the polymerization. The electrochromic device using the above electrolyte developed a dark blue color and showed a transmission of 28%. Upon quenching, the electrochromic device was transparent and showed a transmission of 53%. As mentioned in Example 1, the electrochromic device provided excellent memory effect over 72 hours or more.

Example 5

Example 1 was repeated to provide an electrochromic device comprising an ionic liquid gel polymer electrolyte, except that [BMIM] TFSI] was used as ionic liquid instead of [EMIM] $BF_4$] and that MMA was used as vinyl monomer instead of HEMA.

Similarly to Example 2 using HEMA as vinyl monomer, a slightly opaque gel polymer electrolyte was formed by the polymerization. The electrochromic device using the above electrolyte developed a dark blue color and showed a transmission of 30%. Upon quenching, the electrochromic device was transparent and showed a transmission of 55%. As mentioned in Example 1, the electrochromic device provided excellent memory effect over 72 hours or more.

Example 6

A working electrode was manufactured by coating PEDOT (poly-3,4-ethylenedioxythiophene) as electrode material on ITO glass through an electro-polymerization process to a thickness of about 150 nm. A counter electrode was manufactured by coating PAN (polyacrylonitrile) to a thickness of about 150 nm in the same manner as described above. An electrochromic device free from electrolyte was provided by using the above electrodes in the same manner as described in Example 1-1. Then, an electrochromic device comprising an ionic liquid gel polymer as electrolyte was manufactured in the same manner as described in Example 1-2.

The electrochromic device manufactured by using the above electrolyte developed a dark blue color and showed a transmission of 18%. Upon quenching, the electrochromic device was transparent and showed a transmission of 43%. Additionally, the electrochromic device provided excellent memory effect over 24 hours or more.

Example 7

Example 1 was repeated to provide an electrochromic device comprising an ionic liquid gel polymer electrolyte, except that [BMIM] TFSI] was used as ionic liquid instead of [EMIM] $BF_4$] and that the electrochromic device free from electrolyte was manufactured in the same manner as described in Example 6.

The electrochromic device manufactured by using the above electrolyte developed a dark blue color and showed a transmission of 16%. Upon quenching, the electrochromic device was transparent and showed a transmission of 47%. Additionally, the electrochromic device provided excellent memory effect over 24 hours or more.

Comparative Examples 1-2

Comparative Example 1

An electrochromic device free from electrolyte was manufactured in the same manner as described in Example 1-1. Then, the electrochromic device was finished by using GBL (γ-butyrolactone) containing 1M $LiClO_4$ as liquid electrolyte.

The finished electrochromic device developed a dark blue color and showed a transmission of 34%. Upon quenching, the electrochromic device was transparent and showed a transmission of 76%. In other words, the performance of the electrochromic device was comparable to that of an electrochromic device comprising gel polymer electrolyte that was transparent when prepared by polymerization. However, because the electrochromic device used a liquid electrolyte, it caused a problem related with electrolyte leakage. Additionally, it was not possible to use flexible plastic substrates. There was a great possibility for side reactions between the organic electrolyte and electrodes when used for a long time. Moreover, the electrochromic device showed memory effect over about 12 hours, which was poor compared to an electrochromic device using a gel polymer electrolyte.

Comparative Example 2

An electrochromic device free from electrolyte was manufactured in the same manner as described in Example 1-1. Then, the electrochromic device was finished by using [EMIM] $BF_4$ containing 1M $LiClO_4$ as liquid electrolyte.

The finished electrochromic device developed a dark blue color and showed a transmission of 32%. Upon quenching, the electrochromic device was transparent and showed a transmission of 78%. In other words, the quality of the electrochromic device was comparable to that of an electrochromic device comprising gel polymer electrolyte that was transparent when prepared by polymerization. However, because the electrochromic device used a liquid electrolyte, it caused a problem related with electrolyte leakage. Additionally, it was not possible to use flexible plastic substrates. Moreover, the electrochromic device showed memory effect over about 12 hours, which was poor compared to an electrochromic device using a gel polymer electrolyte.

Experimental Example 1

Evaluation of Reflectance of Electrochromic Device

Reflectance of each electrochromic device comprising an ionic liquid gel polymer electrolyte according to the present invention was measured as follows.

Figure 2:
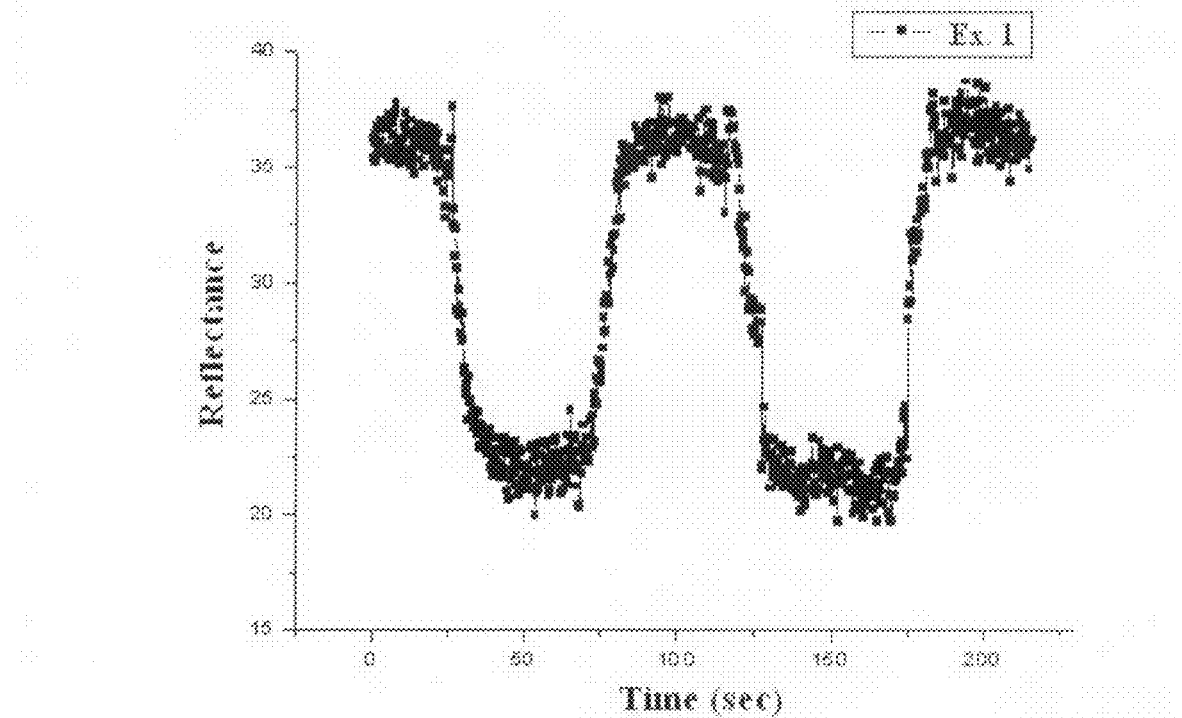
FIG. 2 is a graph showing reflectance of the electrochromic device according to Example 1.
Figure 3:
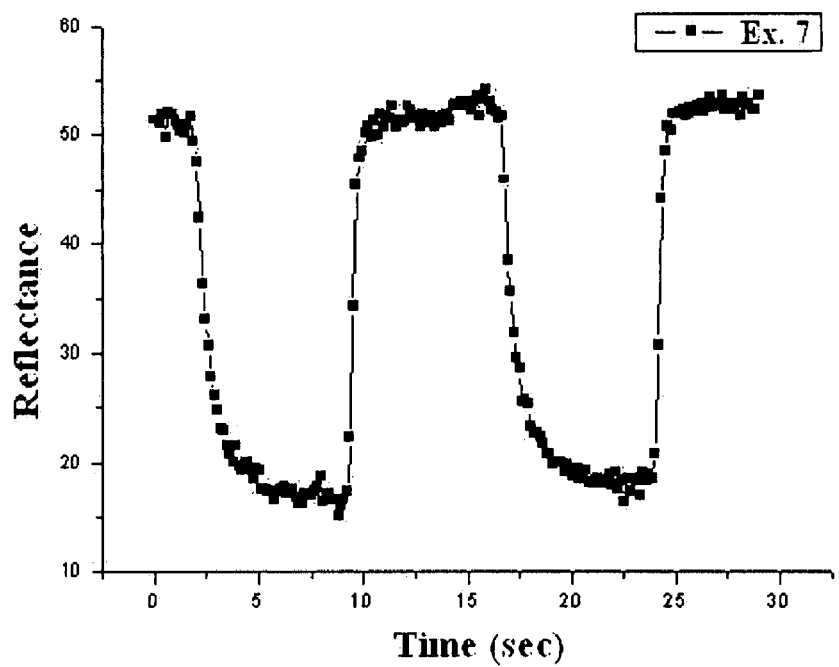
FIG. 3 is a graph showing reflectance of the electrochromic device according to Example 7.

Each electrochromic device according to Example 1 and Example 7 was measured for reflectance. The electrochromic devices according to Example 1 (see, FIG. 2) and Example 7 (see, FIG. 3) showed a reflectance of about 10-30%, upon color developing, and a reflectance of about 35-50% upon quenching.

Particularly, the electrochromic device using inorganic metal oxide, $WO_3/NiO$, electrodes according to Example 1 showed a response rate of a few seconds to several tens seconds in color developing and quenching (cell size: 5×5 cm). This indicates that the electrochromic device realizes color developing and quenching as electrochromic device. Compared to this, the electrochromic device using conductive polymer, PEDOT/PAN, as electrodes according to Example 7 showed a response rate of a few seconds in color developing and quenching (cell size: 5×5 cm), which was significantly higher than the response rate of the electrochromic device using inorganic metal oxide. This indicates that the gel polymer electrolyte using an ionic liquid can also realize color developing and quenching when using conductive polymer electrodes.

INDUSTRIAL APPLICABILITY

As can be seen from the foregoing, the electrochromic device according to the present invention uses a gel polymer electrolyte comprising an ionic liquid. Therefore, there is no problem related with electrolyte leakage. Additionally, it is possible to manufacture electrochromic devices by using plastic materials, because the ionic liquid gel polymer electrolyte according to the present invention permits structural deformation with ease. Further, because the electrochromic device according to the present invention uses an ionic liquid, it is possible to minimize side reactions between constitutional elements of an electrochromic device and electrolyte.

While this invention has been described in connection with what is presently considered to be the most practical and preferred embodiment, it is to be understood that the invention is not limited to the disclosed embodiment and the drawings. On the contrary, it is intended to cover various modifications and variations within the spirit and scope of the appended claims.

The invention claimed is:

1. A method for manufacturing an electrochromic device, which comprises the steps of:
   (a) providing a first electrode and a second electrode;
   (b) injecting an electrolyte precursor solution into the gap between the first electrode and the second electrode through an inlet and sealing the inlet, wherein the electrolyte precursor solution comprises (i) an ionic liquid, (ii) a monomer operable for forming a gel polymer by polymerization, and (iii) a polymerization initiator, and wherein the electrolyte precursor has a mixing ratio on the weight basis of 0.5-0.95:0.05-0.5:0.00-0.05, when, x represents ionic liquid, y represents monomer operable for forming a gel polymer by polymerization, and z represents polymerization initiator, with the provision that x+y+z=1; and
   (c) polymerizing the electrolyte precursor solution to form an ionic liquid gel polymer electrolyte.

2. The method according to claim 1, wherein the electrochromic device comprises the electrochromic material in at least one of the first electrode, the second electrode and the electrolyte.

3. The method according to claim 1, wherein the ionic liquid comprises a combination of:
   (i) a cation selected from the group consisting of ammonium, imidazolium, oxazolium, piperidinium, pyrazinium, pyrazolium, pyridazinium, pyridinium, pyrimidinium, pyrrolidinium, pyrrolinium, pyrrolium, thriazolium and triazolium, and
   (ii) an anion selected from the group consisting of $F^-$, $Cl^-$, $Br^-$, $I^-$, $NO_3^-$, $N(CN)_2^-$, $BF_4^-$, $ClO_4^-$, $RSO_3^-$, $RCOO^-$ (wherein R is a C1~C9 alkyl group or phenyl group); $PF_6^-$, $(CF_3)_2PF_4^-$, $(CF_3)_3PF_3^-$, $(CF_3)_4PF_2^-$, $(CF_3)_5PF^-$, $(CF_3)_6P^-$, $(CF_3SO_3^-)_2$, $(CF_2CF_2SO_3^-)_2$, $(CF_3SO_3)_2N^-$, $CF_3CF_2(CF_3)_2CO^-$, $(CF_3SO_2)_2CH^-$, $(SF_5)_3C^-$, $(CF_3SO_2)_3C^-$, $CF_3(CF_2)_7SO_3^-$, $CF_3CO_2^-$ and $CH_3CO_2^-$.

4. The method according to claim 1, wherein the monomer is at least one vinyl monomer selected from the group consisting of acrylonitrile, methyl methacrylate, methyl acrylate, methacrylonitrile, methyl styrene, vinyl esters, vinyl chloride, vinylidene chloride, acrylamide, tetrafluoroethylene, vinyl acetate, methyl vinyl ketone, ethylene, styrene, para-methoxy styrene, para-cyanostyrene and acrylates.

5. The method according to claim 1, wherein the electrolyte precursor solution further comprises a lithium salt or acid.

* * * * *